C. S. Trevitt,

Cage Trap,

№ 70,134. Patented Oct. 22, 1867.

Witnesses:
Geo. W. Rothwell
Chas. A. Petit

Inventor:
C. S. Trevitt
by Munn & Co.
Attorneys

United States Patent Office.

C. S. TREVITT, OF WASHINGTON, DISTRICT OF COLUMBIA, ASSIGNOR TO HIMSELF AND H. E. WENTWORTH, OF THE SAME PLACE.

Letters Patent No. 70,134, dated October 22, 1867.

IMPROVED ANIMAL TRAP.

*The Schedule referred to in these Letters Patent and making part of the same.*

TO ALL WHOM IT MAY CONCERN:

Be it known that I, C. S. TREVITT, of the city and county of Washington, and District of Columbia, have invented a new and improved Animal Trap; and I do hereby declare the following to be a full, clear, and exact description of the same, reference being had to the accompanying drawings, forming part of this specification, and in which—

Similar letters of reference indicate corresponding parts in the two figures.

Figure 1:
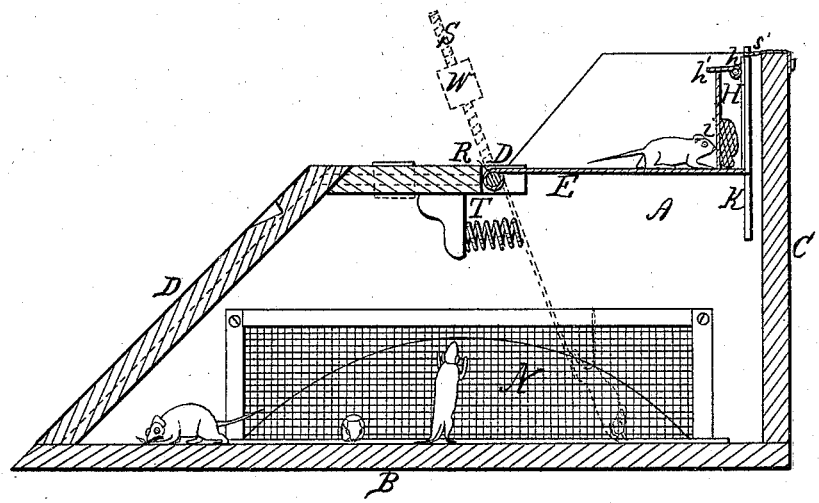
Figure 1 is a longitudinal vertical section of my invention through the line $x\, x$ of fig. 2.
Figure 2:
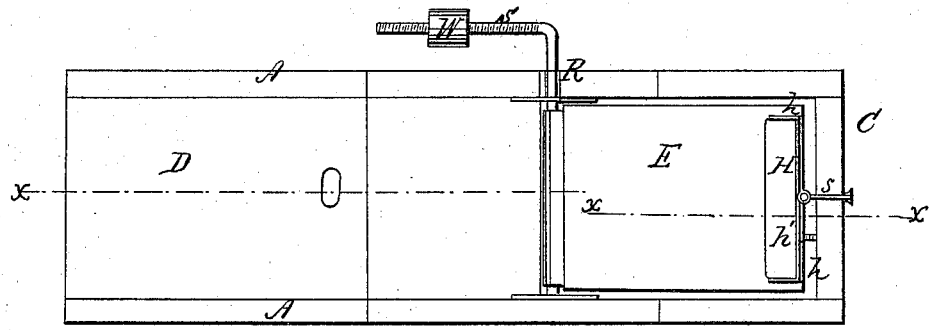
Figure 2 is a top view of my invention.

This invention relates to that class of traps in which the animal steps on a trap-door in his effort to secure the bait, and by endeavoring to get at the bait springs the trap, and is precipitated into the chamber below. The invention consists in a new method of setting the trap-door and securing the bait, and in a new device for adjusting the door to animals of different weights.

In order that others skilled in the art to which my invention appertains may be enabled to make and use the same, I will proceed to describe it in detail.

In the drawings, A A represent the side walls of my trap, B the bottom, C the highest or vertical end wall, and D the lower or inclined end wall opposite to the wall C. The wall D is made removable, in order to empty the trap. One of the walls is provided with a gauze window W. E is a trap-door covering the greater portion of the top of the trap, and pivoted on the rod R, to which it is firmly fixed. The outer end of that rod is bent backward and cut into a screw, $s$, upon which a weight, $w$, screws back and forth. When the weight is screwed close up to the trap-door a very small animal may spring the trap, but when it is screwed back to the extremity of the rod R nothing but an animal of considerable size can enter the trap. By thus adjusting the trap-door, and providing a sufficient weight, the trap may be made to operate equally well for animals of every different size and weight, and may be adjusted to refuse admission to a class of animals which it is not desired to entrap.

The trap-door is operated by the following apparatus: A small metallic box, H, is hung or pivoted on a rod, $h$, above the free end of the trap-door, and is provided with a hole, $i$, in front, through which the animal can see the bait, and a cover, $h'$, on its top to prevent the abstraction of the bait. The hole $i$ is made too small to admit the head of the animal, but sufficiently large to tempt him to endeavor to enter it. A rod, $k$, attached to the box H, and projecting downward below it, has a small notch in its side, on which the end of the trap-door catches, when in a horizontal position, and sets the trap. This notch will hold the trap set until the animal tries to enter the swinging box H to get at the bait, in doing which he will push the box back, liberate the trap-door, and precipitate himself into the chamber below. The trap-door will immediately set itself again by the gravity of the weight $w$. A rubber spring, $s'$, may be attached to the top of the box H and end wall C, in order to insure the proper setting of the trap. The side walls A A are made higher alongside of the trap-door than elsewhere to form a sort of avenue through which the animal will be obliged to approach the bait. A spring, T, may be provided under the trap-door to assist in its return when sprung.

Having thus described my invention, what I claim as new, and desire to secure by Letters Patent, is—

1. The swinging bait-box H, having the cover $h'$ and the aperture $i$, substantially as and for the purpose specified.

2. The combination of the adjustable weight $w$, rod R, trap-door E, box H, and notched rod $k$, substantially as and for the purpose described.

C. S. TREVITT.

Witnesses:
  CHARLES A. PETTIT,
  NATHAN K. ELLSWORTH.